(12) United States Patent
Sakikawa et al.

(10) Patent No.: US 10,086,328 B2
(45) Date of Patent: Oct. 2, 2018

(54) HUMIDITY CONTROLLING APPARATUS

(71) Applicants: Sharp Kabushiki Kaisha, Sakai-shi, Osaka (JP); A SCHOOL CORPORATION KANSAI UNIVERSITY, Suita-shi, Osaka (JP)

(72) Inventors: Nobuki Sakikawa, Sakai (JP); Yoshihiro Uramoto, Sakai (JP); Yasumasa Suzuki, Sakai (JP); Akihiro Yamaguchi, Sakai (JP); Takashi Miyata, Suita (JP); Kazuya Matsumoto, Suita (JP)

(73) Assignees: SHARP KABUSHIKI KAISHA, Sakai (JP); A SCHOOL CORPORATION OF KANSAI UNIVERSITY, Osaka (JP)

( * ) Notice: Subject to any disclaimer, the term of this patent is extended or adjusted under 35 U.S.C. 154(b) by 85 days.

(21) Appl. No.: 15/122,427

(22) PCT Filed: Jun. 5, 2015

(86) PCT No.: PCT/JP2015/066335
§ 371 (c)(1),
(2) Date: Aug. 30, 2016

(87) PCT Pub. No.: WO2016/035403
PCT Pub. Date: Mar. 10, 2016

(65) Prior Publication Data
US 2017/0065930 A1    Mar. 9, 2017

(30) Foreign Application Priority Data

Sep. 3, 2014    (JP) ................................. 2014-179019

(51) Int. Cl.
*B01D 53/26*    (2006.01)
*B01J 20/26*    (2006.01)
(Continued)

(52) U.S. Cl.
CPC ........... *B01D 53/263* (2013.01); *B01D 53/26* (2013.01); *B01D 53/28* (2013.01); *B01J 20/26* (2013.01);
(Continued)

(58) Field of Classification Search
CPC ...... B01D 53/26; B01D 53/261; B01D 53/28; B01D 2259/40094; B01D 2259/40098;
(Continued)

(56) References Cited

U.S. PATENT DOCUMENTS 5,334,629 A * 8/1994 Zirino ....................... A61F 2/08
                                                         252/500
5,534,186 A * 7/1996 Walker ................. B01D 53/261
                                                         252/194

FOREIGN PATENT DOCUMENTS

JP       05-301014 A      11/1993
JP       2001-259349 A    9/2001
(Continued)

OTHER PUBLICATIONS

Machine generated English translation of WO 2012/050084 A1, published Apr. 2012.*

(Continued)

*Primary Examiner* — Frank M Lawrence, Jr.
(74) *Attorney, Agent, or Firm* — Keating & Bennett, LLP

(57) ABSTRACT

A humidity controlling apparatus comprises: a moisture absorbent (1) made of a macromolecular gelated moisture absorbing material which takes a first state being capable of absorbing moisture and a second state releasing in a liquid state the moisture absorbed in the first state, and which has a nature to change from the first state to the second state when a definite level of temperature or higher is attained, and return to the first state when the definite level of temperature or higher is no longer attained; and an energy (Continued)

converting particle (2) which is disposed so as to be buried inside the moisture absorbent and has a nature to generate heat when it is exposed to an external stimulus factor which is at least one of light, electric waves and a high frequency magnetic field.

5 Claims, 9 Drawing Sheets

(51) Int. Cl.
  *B01J 20/28* (2006.01)
  *B01J 20/34* (2006.01)
  *B01D 53/28* (2006.01)
  *F24F 3/14* (2006.01)

(52) U.S. Cl.
  CPC .............. *B01J 20/28* (2013.01); *B01J 20/34* (2013.01); *B01J 20/3483* (2013.01); *F24F 3/14* (2013.01); *F24F 3/1429* (2013.01)

(58) Field of Classification Search
  CPC .......... F24F 3/14; F24F 3/1423; F24F 3/1429; F24F 2203/1032; F01J 20/26; F01J 20/28; F01J 20/34; F01J 20/3483; F01J 20/28026
  USPC ............ 95/113, 117, 126; 96/108, 125, 153; 34/80, 472, 473
  See application file for complete search history.

(56) References Cited

FOREIGN PATENT DOCUMENTS

| | | |
|---|---|---|
| JP | 2003-144833 A | 5/2003 |
| JP | 2005-034838 A | 2/2005 |
| WO | 2012/050084 A1 | 4/2012 |

OTHER PUBLICATIONS

Suzuki et al, "Phase transitioon in polymer gels induced by visible light" Nature vol. 346, pp. 345-347, Jul. 1990.*

* cited by examiner

HUMIDITY CONTROLLING APPARATUS

TECHNICAL FIELD

The present invention relates to a humidity controlling apparatus.

BACKGROUND ART

Apparatuses for performing dehumidification and humidity control include a refrigeration cycle-type apparatus and a zeolite-type apparatus. A "refrigeration cycle-type" apparatus is mostly an apparatus in which a compressor, i.e., a compression machine, is built therein, indoor air is cooled by an evaporator, i.e., an evaporation machine, and thereby moisture in the air is condensed into dew to dehumidify the air. In a "zeolite-type" apparatus, moisture in indoor air is absorbed by a rotor, and the rotor which has absorbed moisture is subjected to hot air generated by an electric heater, to take out the moisture in the rotor as hot and highly humid air, which is cooled by the indoor air, and thereby moisture contained in the hot and highly humid air is condensed into dew and is taken out.

Japanese Patent Laying-Open No. 2003-144833 (PTD 1) can be cited as a document that describes an example of the refrigeration cycle-type apparatus. Japanese Patent Laying-Open No. 2001-259349 (PTD 2) can be cited as a document that describes an example of the zeolite-type apparatus. Japanese Patent Laying-Open No. 2005-34838 (PTD 3) describes a configuration having combined features of the apparatuses of both types.

As a large-scale air conditioning system, a so-called desiccant air conditioning system is also prevalent that uses a hygroscopic element, i.e., e.g., zeolite or the like and utilizes this element's moisture adsorption and desorption phenomenon to perform air conditioning such a cooling. In response to a demand for terrestrial environment protection, highly efficient moisture controlling systems are still being vigorously developed. One example thereof is described in Japanese Patent Laying-Open No. 5-301014 (patent document 4).

For the above described desiccant air conditioning system, a moisture absorbing/releasing material composed of a base material of glass fiber and a polyacrylate based macromolecular compound carried on the base material is mixed with fine carbon black particles or the like intended for photothermal conversion to attempt to effectively use solar light in recycling the moisture absorbing/releasing material. One example thereof is described in WO 2012/050084 (patent document 5).

CITATION LIST

Patent Documents

Patent document 1: Japanese Patent Laying-Open No. 2003-144833
Patent document 2: Japanese Patent Laying-Open No. 2001-259349
Patent document 3: Japanese Patent Laying-Open No. 2005-34838
Patent document 4: Japanese Patent Laying-Open No. 5-301014
Patent document 5: WO 2012/050084

SUMMARY OF INVENTION

Technical Problem

In the desiccant system a moisture absorbent has been recycled by being exposed to hot air of several hundreds degrees centigrade or by being externally heated directly by a heater's radiant heat. Any of the approaches has a constraint for a moisture absorbent, i.e., initially externally heats it.

Typical thermosensitive macromolecular gels are utilized in a solvent, and present an LCST (a lower critical solution temperature) so that when the solvent is heated the gel shrinks and at low temperature the gel swells. While there is also a gel which presents a UCST, the LCST is focused on herein. It is well known that when the solvent is heated, the gel shrinks first at a portion which directly contacts the solvent, and for example when the gel is in the form of a particle, the particle has an external peripheral portion shrunk and thus forming a moisture impermeable shell, i.e., a so-called skin layer, which prevents moisture inside the particle from entering and exiting, i.e., causes a skin effect. As the same effect as this, when a moisture absorbent using a thermosensitive macromolecular gel used in the air is externally heated, it is also prone to form a hydrophobic film on an external periphery of the moisture absorbent that prevents a water molecule from moving. In other words, once the hydrophobic film has been formed on the external periphery of the moisture absorbent by the skin effect, there is a case in which it is difficult to extract the internal water molecule.

When a moisture absorbing/releasing material is mixed with a photothermal conversion material such as fine carbon black particles, as described in patent document 5, the moisture absorbing/releasing material can be heated from inside by solar light etc., however, it releases moisture as water vapor and accordingly, to implement indoor dehumidification, it is necessary to guide outdoor and thus exhaust the moisture released from the moisture absorbing/releasing material as water vapor, or to use a heat exchanger to condense the water vapor to be water in the form of liquid.

When the above described moisture absorbing/releasing material is heated with microwave, it has an external surface and a vicinity thereof initially hydrophobized to be shelly, and pressure exerted by internally generated water vapor is increased inside and there is also a case in which the moisture absorbing/releasing material ruptures.

Accordingly, the present invention contemplates a humidity controlling apparatus which can avoid the problem of an external hydrophobic film being formed and making it difficult to extract an internal water molecule.

Solution to Problem

To achieve the aforementioned object, a humidity controlling apparatus according to the present invention includes: a moisture absorbent made of a macromolecular gelated moisture absorbing material which takes a first state being capable of absorbing moisture and a second state releasing in a liquid state the moisture absorbed in the first state, and which has a nature to change from the first state to the second state when a definite level of temperature or higher is attained, and return to the first state when the definite level of temperature or higher is no longer attained; and an energy converting particle which is disposed so as to be buried inside the moisture absorbent and has a nature to generate heat when it is exposed to an external stimulus factor which is at least one of light, electric waves and a high frequency magnetic field.

Advantageous Effects of Invention

The present invention can thus provide a humidity controlling apparatus which can avoid the problem of an external hydrophobic film being formed and making it difficult to extract an internal water molecule.

DESCRIPTION OF EMBODIMENTS (First Embodiment)

Figure 1:
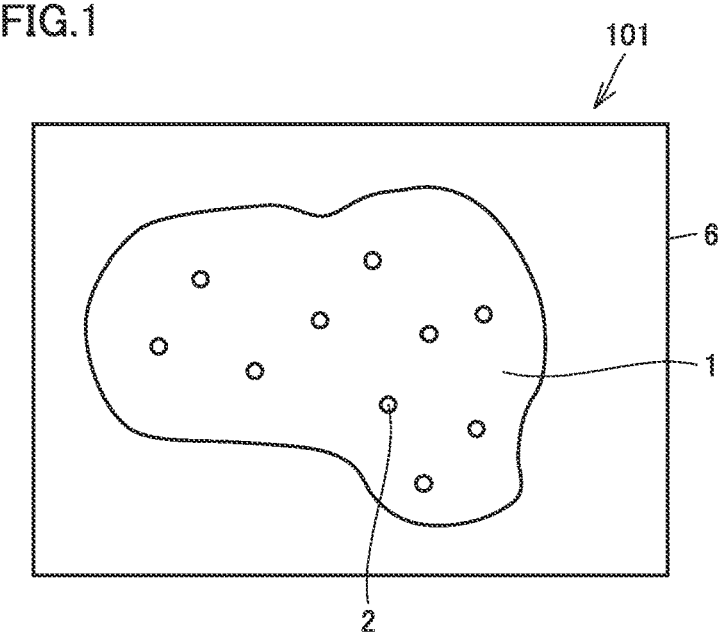
FIG. 1 is a conceptual view of a humidity controlling apparatus in a first embodiment based on the present invention.

With reference to FIG. 1, a humidity controlling apparatus in a first embodiment based on the present invention will now be described.

As shown in FIG. 1, a humidity controlling apparatus 101 in the present embodiment includes: a moisture absorbent 1 made of a macromolecular gelated moisture absorbing material which takes a first state being capable of absorbing moisture and a second state releasing in a liquid state the moisture absorbed in the first state, and which has a nature to change from the first state to the second state when a definite level of temperature or higher is attained, and return to the first state when the definite level of temperature or higher is no longer attained; and an energy converting particle 2 which is disposed so as to be buried inside moisture absorbent 1 and has a nature to generate heat when it is exposed to an external stimulus factor which is at least one of light, electric waves and a high frequency magnetic field.

The first state of the macromolecular gelated moisture absorbing material is a hydrophilic state, and the second state thereof is a hydrophobic state.

Humidity controlling apparatus 101 indicated herein includes a casing 6 as an example. Moisture absorbent 1 is held in casing 6. Casing 6 has an air inlet for guiding air to moisture absorbent 1 and an air outlet for allowing the air to exit therethrough after moisture absorbent 1 is exposed thereto.

Humidity controlling apparatus 101 includes moisture absorbent 1 of a macromolecular gelated moisture absorbing material. This macromolecular gelated moisture absorbing material is a so-called stimulus responsive, sensitive gel. A phenomenon of this macromolecular gelated moisture absorbing material absorbing moisture in the air and a phenomenon of the material discharging water in response to a stimulus can be utilized to convert water vapor into condensed water without using supercooling or a large amount of heat. In moisture absorbent 1, a volume phase transition which arises between water and a macromolecule is exploited to extract water (liquid) from air which contains water vapor (gas). In this case, moisture absorbent 1 is hydrophilized/hydrophobized as controlled by thermal stimulation, and when it is hydrophilic, a large number of water molecules taken in throughout a polymer network are bonded by hydrogen bonding and thus clustered together. By heating and thus hydrophobizing the polymer network to purge water molecules taken in the network, a microscopic region in which the water molecules gather is formed, and finally, these water molecules will emerge outside as water. When the moisture absorbent of the sensitive gel as described above is externally exposed to heat, it has an external side first hydrophobized, and there is a concern that the hydrophobized portion prevents movement of water when or after an internal hydrophilic portion becomes hydrophobic. In contrast, in the present embodiment, moisture absorbent 1 contains energy converting particle 2 as a portion which thermally vibrates, and energy converting particle 2 can be exposed to a stimulus factor to generate heat which can in turn be transferred in order from inside outward and a hydrophobic portion can accordingly extend in order from inside outward to thus purge taken moisture efficiently outside.

Thus in the present embodiment a humidity controlling apparatus can be provided which can avoid the problem of an external hydrophobic film being formed and making it difficult to extract an internal water molecule.

Preferably, the type of the stimulus factor which causes energy converting particle 2 to generate heat is light, for example. This is because light can be supplied targeting a desired location. Hereinafter, energy converting particle 2 will be described as a fine particle which converts light into heat (hereinafter a "fine photothermal conversion particle"). The fine photothermal conversion particle can for example be a fine carbon black particle. Alternatively, silica, alumina, aluminosilicate, titania, zirconia, iron oxide or similar typical metal oxides or a gold nanoparticle etc. can be used as the fine photothermal conversion particle. Alternatively, although having a drawback for high temperature, a typical crosslinked resin particle such as of nylon, PMMA, silicone, Teflon (registered trademark), polyethylene, polystyrene can also be used as the fine photothermal conversion particle depending on the condition.

Figure 2:
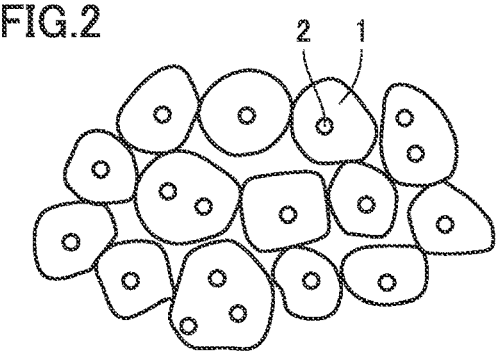
FIG. 2 is a conceptual view of an exemplary variation of a moisture absorbent included in the humidity controlling apparatus in the first embodiment based on the present invention.

In FIG. 1, moisture absorbent 1 is illustrated as a single large mass. However, moisture absorbent 1 is not limited in form thereto. For example, preferably, as shown in FIG. 2, moisture absorbent 1 is particulate, and energy converting particle 2 is buried in each particle of moisture absorbent 1. This configuration allows an increased surface area and hence efficient moisture absorption. A single particle of moisture absorbent 1 does not necessarily contain only a single energy converting particle 2, and as shown in FIG. 2, a single particle of moisture absorbent 1 may contain a plurality of energy converting particles 2. In FIG. 2, the casing and others are not shown.

While FIG. 2 shows particles varying in size, the particles may be uniform in size. While FIG. 2 shows particles indefinite in form, each particle may have a shape close to a sphere.

The configuration in which energy converting particle 2 was buried inside particulate moisture absorbent 1 can be obtained as follows: In producing a macromolecular material having a nature collecting and absorbing water vapor in the air, before the macromolecular material is gelated or solidified a fine photothermal conversion particle which serves as energy converting particle 2 is dispersed in an appropriate amount and the macromolecular material containing the fine photothermal conversion particle of nano size is formed in a massive form. This massive macromolecular material is crushed and furthermore, classified. Moisture absorbent 1 having a uniform particle diameter can thus be obtained. Moisture absorbent 1 is a particulate macromolecular gelated moisture absorbing material. Moisture absorbent 1 will contain energy converting particle 2.

Alternatively, a typical sedimentation method in which when the macromolecular material gelates or solidifies a surfactant is introduced and the material is made into particles under a heating condition of approximately a thermosensitive point, can also be used to produce a particulate macromolecular gelated moisture absorbing material. When it is produced without crushing or sedimentation, a macromolecular material in the form of a block or a film having dispersed therein fine photothermal conversion particles to serve as energy converting particle 2, can be formed.

(Example Operation)

Figure 3:
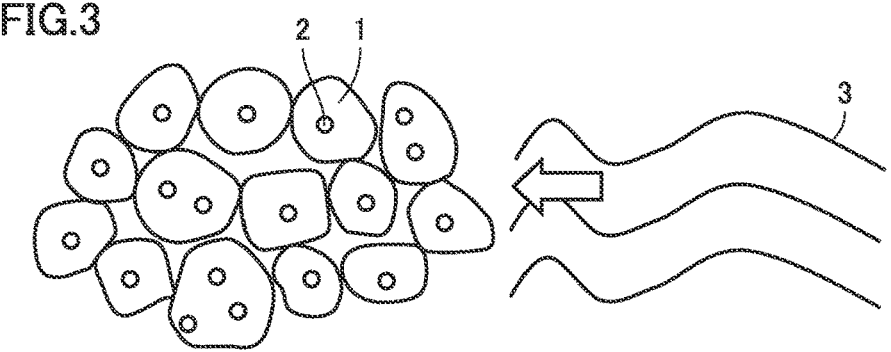
FIG. 3 illustrates a particulate moisture absorbent exposed to blown air.

When moisture absorbent 1 has a definite level of temperature or lower and assumes a first state, i.e., when moisture absorbent 1 assumes a state capable of absorbing moisture, a collection of particles of moisture absorbent 1 containing energy converting particle 2 is exposed to moist air 3, as shown in FIG. 3. Moisture absorbent 1 absorbs the moisture contained in air 3 and can thus reduce the humidity of air 3. The first state is a state where moisture absorbent 1 is hydrophilic.

Figure 4:
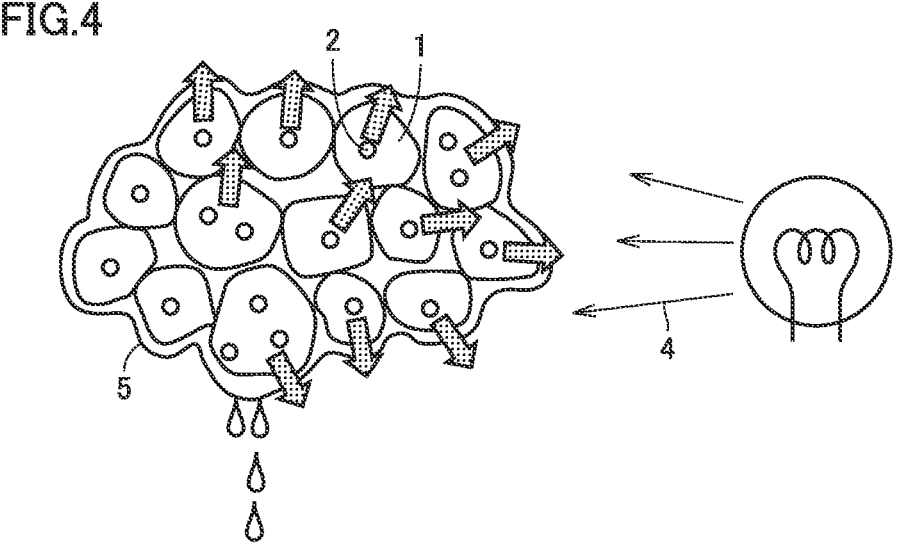
FIG. 4 illustrates a particulate moisture absorbent having absorbed moisture exposed to light.
Figure 5:
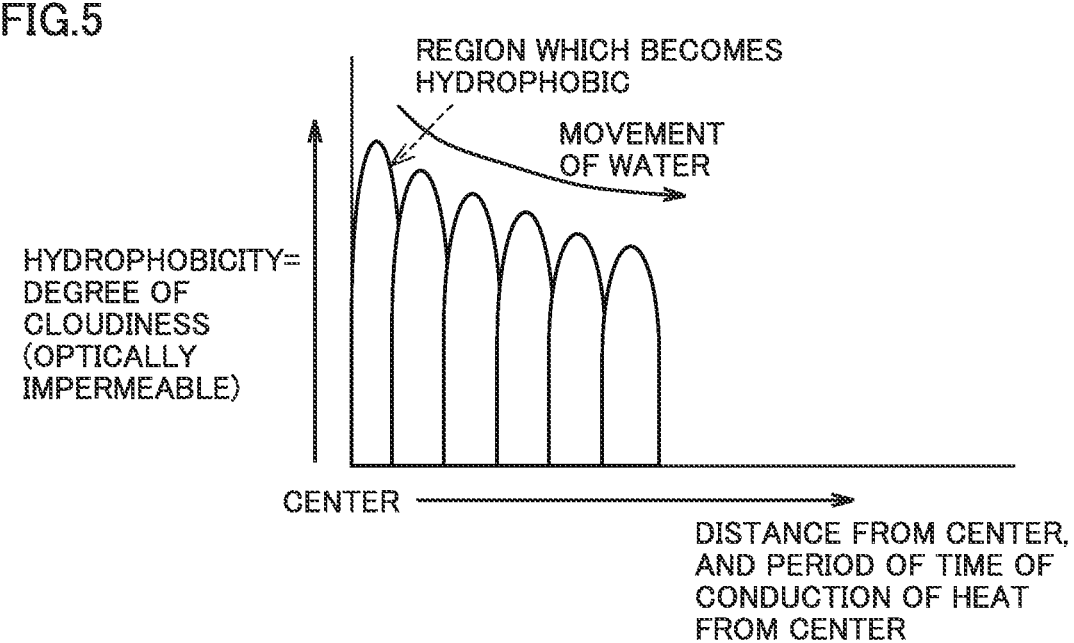
FIG. 5 is a graph which shows how a moisture absorbent extends a hydrophobic region in order from the center toward an external surface.

As shown in FIG. 4, when the collection of particles of moisture absorbent 1 having absorbed moisture is exposed to light 4, energy converting particle 2 in moisture absorbent 1 generates heat. As a result, moisture absorbent 1 has a temperature increased from inside and changes to a second state such that it extends from inside in order. The second state is a state which releases absorbed moisture in a liquid state. The second state is a state where moisture absorbent 1 is hydrophobic. FIG. 5 represents how moisture absorbent 1 extends a hydrophobic region in order from the center toward an external surface as energy converting particle 2 disposed at the center of particulate moisture absorbent 1 generates heat. The moisture absorbed in moisture absorbent 1 at the center and in a vicinity thereof is also purged to a vicinity of a surface by such a principle. When moisture absorbent 1 assumes the second state substantially completely up to the surface, the moisture is purged out of moisture absorbent 1.

Thus, as shown in FIG. 4, water 5 in a liquid state is purged and thus emerges on a periphery of moisture absorbent 1. Water 5 pulled by gravity and thus falls in the liquid state. This falling water may be received in a container and thus collected. Thus, water of the liquid state can be obtained. Meanwhile, moisture absorbent 1 returns to a state where it does not have moisture absorbed therein. When exposing moisture absorbent 1 to light 4 is stopped, energy converting particle 2 stops generating heat and the temperature of moisture absorbent 1 falls. When the temperature falls, moisture absorbent 1 returns to the first state where it can absorb moisture again.

When the stimulus factor which causes energy converting particle 2 to generate heat is light, the heating capacity depends on the moisture absorbent's optical transmittance. To prevent the heating capacity from depending on such a factor and obtain a more uniform thermal distribution, adopting a high frequency magnetic field instead of light as a stimulus factor may also be considered. For example, a high frequency magnetic field may be applied to cause energy converting particle 2 to generate heat. To implement this, while iron oxide may be considered as a typical material for energy converting particle 2, a LaSrMn based material etc. may also be considered.

Note that to discharge water 5 purged from an interior of moisture absorbent 1 to a periphery thereof, centrifugal force etc. may be utilized other than gravity.

Note that although moisture absorbent 1 has been described herein as being a particle, being a particle is only one example, and other than being a particle, the moisture absorbent may be in the form of sheet, film, fiber or the like.

(Second Embodiment)

Figure 6:
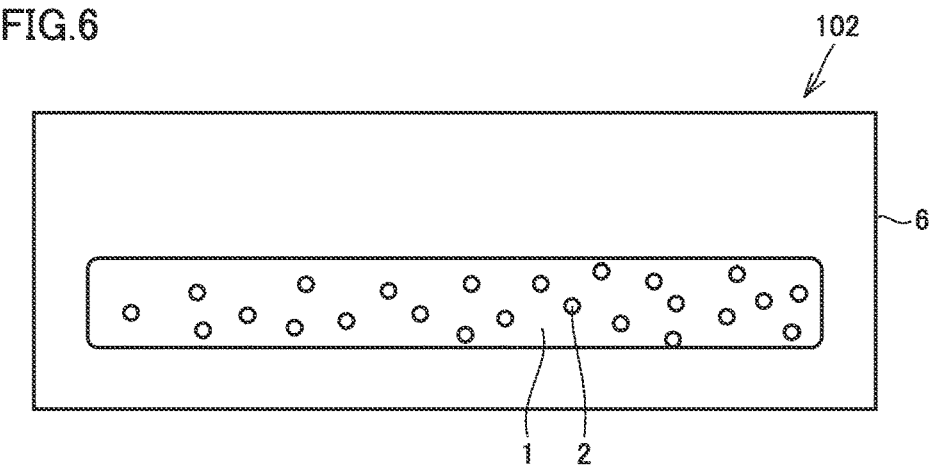
FIG. 6 is a conceptual view of a humidity controlling apparatus in a second embodiment based on the present invention.

With reference to FIG. 6, a humidity controlling apparatus in a second embodiment based on the present invention will now be described.

As shown in FIG. 6, in a humidity controlling apparatus 102 in the present embodiment, moisture absorbent 1 is in the form of a plate. The present embodiment is similar to the first embodiment in that energy converting particle 2 is disposed such that it is buried inside moisture absorbent 1. Energy converting particle 2 may be buried in moisture absorbent 1 at a random location. Humidity controlling apparatus 102 includes casing 6 as an example.

In the present embodiment, moisture absorbent 1 is in the form of a plate, which ensures a large surface area and hence allows efficient moisture absorption. Furthermore, it can also efficiently release moisture.

Figure 7:
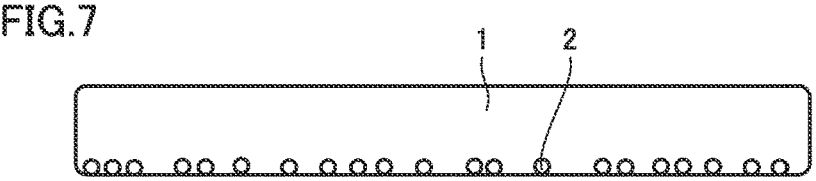
FIG. 7 is a conceptual view of a first exemplary variation of a moisture absorbent in the form of a plate included in the humidity controlling apparatus in the second embodiment based on the present invention.

Preferably, as shown in FIG. 7, energy converting particle 2 is unevenly distributed at a position close to one surface of moisture absorbent 1. While FIG. 7 shows energy converting particles 2 all aligned along one surface of moisture absorbent 1, energy converting particles 2 may be disposed randomly as long as they are unevenly positioned close to one surface of moisture absorbent 1. It is not necessary to have energy converting particles 2 all in contact with one surface of moisture absorbent 1. For example, they may be roughly unevenly disposed as shown in FIG. 8.

Figure 8:
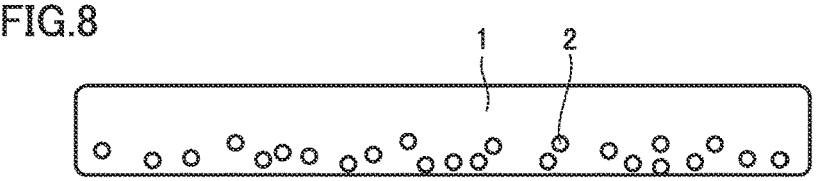
FIG. 8 is a conceptual view of a second exemplary variation of a moisture absorbent in the form of a plate included in the humidity controlling apparatus in the second embodiment based on the present invention.

When energy converting particle 2 unevenly distributed at a position close to one surface of moisture absorbent 1, as shown in FIG. 7 or FIG. 8, is exposed to a stimulus factor and thus generates heat, moisture absorbent 1 will be heated gradually from one surface toward the other surface, and can thus deliver most of moisture contained inside moisture absorbent 1 from a vicinity of one surface to the other surface successively and finally, externally release it from the other surface. Disposing energy converting particles 2 substantially all in contact with one surface of moisture absorbent 1, as shown in FIG. 7, is preferable, as doing so more reliably allows moisture to be delivered from one surface to the other surface.

Figure 9:
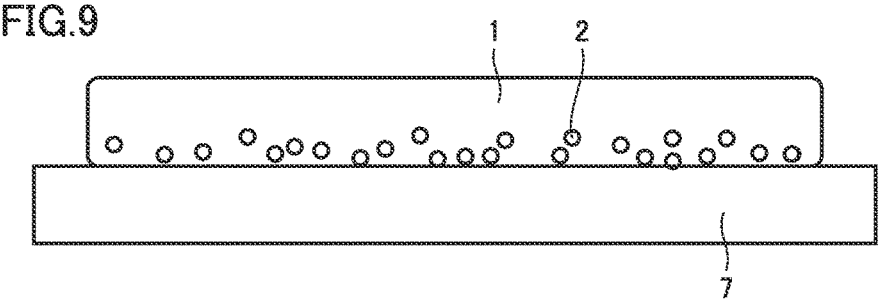
FIG. 9 is a conceptual view of a configuration in which the second exemplary variation of the moisture absorbent in the form of the plate included in the humidity controlling apparatus in the second embodiment based on the present invention, is supported on a substrate.

As shown in FIG. 9, moisture absorbent 1 in the form of a plate may be supported by a substrate 7. In that case, preferably, energy converting particle 2 in moisture absorbent 1 is unevenly disposed in a vicinity of a surface closer to substrate 7. With such a distribution, when energy converting particle 2 generates heat, the moisture absorbed in moisture absorbent 1 will be delivered toward and smoothly released from a surface which is not adjacent to substrate 7.

Figure 10:
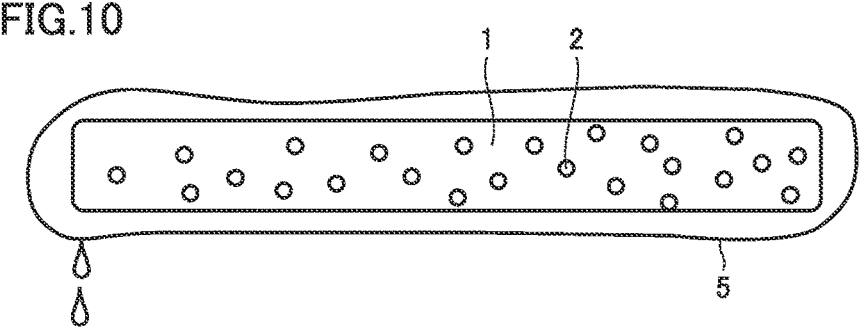
FIG. 10 is a conceptual view of how the moisture absorbent in the form of the plate included in the humidity controlling apparatus in the second embodiment based on the present invention releases water.

As shown in FIG. 10, in a case where moisture absorbent 1 in the form of the plate can alone maintain a thin posture without a substrate, when energy converting particle 2 generates heat, water 5 is released without distinguishing the front and back surfaces. Water 5 released from moisture absorbent 1 is pulled by gravity and thus falls downward.

While FIG. 10 shows moisture absorbent 1 in the form of the plate extending horizontally, to cause released water 5 to efficiently fall via gravity, disposing moisture absorbent 1 in the form of the plate to extend vertically is preferable.

Moisture absorbent 1 may be in the form of a thin film or may be in the form of a block. Desirably, when moisture absorbent 1 is seen in a plan view, energy converting particles 2 are not unevenly distributed depending on the portion in the plane and instead distributed as uniformly as possible. In the depthwise direction, unevenly disposing energy converting particles 2 in moisture absorbent 1 close to a center or a surface may also be considered. Alternatively, when moisture absorbent 1 is disposed to overlap one side of the base material, unevenly disposing energy converting particles 2 in moisture absorbent 1 on a side closer to the base material may also be considered. Energy converting particles 2 can unevenly be disposed as adjusted depending on the surrounding environment. Generally, when the moisture absorbent is attached to the base material, unevenly disposing energy converting particles in a vicinity of the base material is preferable since doing so does not prevent water from being released, however, it may be adjusted in view of the moisture absorbent's moisture absorption capacity and heat conducting characteristic. To avoid the above described skin effect and also prevent the energy converting particles from escaping as the moisture absorbent swells and shrinks, the energy converting particles should not be disposed at a surface of the moisture absorbent exposed to the air but disposed in an internal portion of the moisture absorbent away from the surface to some extent.

(Supplementary Note 1) The stimulus factor is light.

(Supplementary Note 2) The moisture absorbent is in the form of a plate.

(Supplementary Note 3) The energy converting particle is unevenly distributed at a position close to one surface of the moisture absorbent.

(Third Embodiment)

Figure 11:
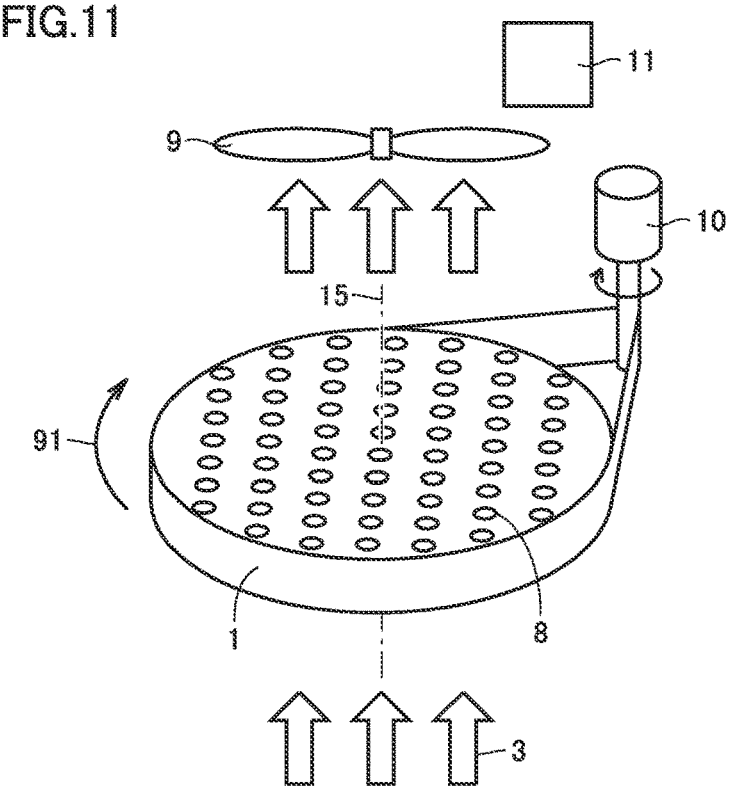
FIG. 11 illustrates a first operational state of a humidity controlling apparatus in a third embodiment based on the present invention.
Figure 12:
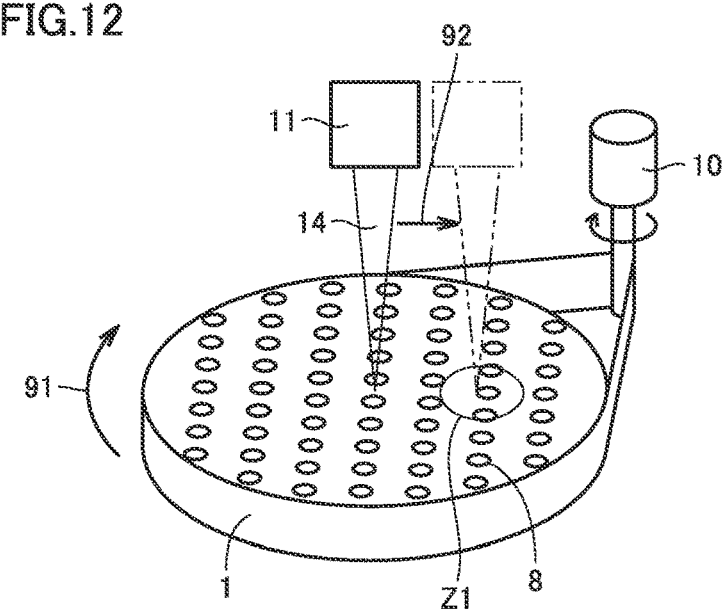
FIG. 12 illustrates a second operational state of the humidity controlling apparatus in the third embodiment based on the present invention.

With reference to FIG. 11 and FIG. 12, a humidity controlling apparatus in a third embodiment based on the present invention will now be described.

In the humidity controlling apparatus in the present embodiment, the stimulus factor which causes energy converting particle 2 to generate heat is light, and as shown in FIG. 11, moisture absorbent 1 is disposed in the form of a disk, and the humidity controlling apparatus includes a rotation device 10 rotating moisture absorbent 1 about a central axis 15, and a radiation device 11 which exposes a surface of moisture absorbent 1 to light. The remainder of the basic configuration is similar to those described in the previous embodiments. Moisture absorbent 1 is provided with a large number of vent holes 8 penetrating moisture absorbent 1 in the direction of the thickness. This humidity controlling apparatus includes an air blowing fan 9, and air blowing fan 9 can cause wind 3. Moisture absorbent 1 can rotate as indicated by an arrow 91. While rotation device 10 is herein shown to rotate moisture absorbent 1 via a belt wound on a circumference of moisture absorbent 1, this is merely an example and it may rotate moisture absorbent 1 by a different mechanism. For example, it may be a structure in which a rotation shaft member is provided along central axis 15 of moisture absorbent 1 to impart a rotary movement directly to the rotation shaft member. FIG. 11 shows the step of causing moisture absorbent 1 to absorb moisture in the air.

Radiation device 11 converges light into a spot and exposes a surface of moisture absorbent 1 thereto, and thus scans moisture absorbent 1 with the spot of light from an inner side toward an outer side.

In the step of extracting the moisture absorbed in moisture absorbent 1, as shown in FIG. 12, radiation device 11 radiates laser light 14. Herein, while laser light 14 is adopted as an example of light, it is not limited to laser light and may be a different type of light. Laser light is preferable, however. As shown in FIG. 12, radiation device 11 can converge laser light 14 into a spot and thus scan moisture absorbent 1 from an inner side toward an outer side, as indicated by an arrow 92. Although this scanning may be performed by moving radiation device 11 per se, radiation device 11 may not necessarily be moved per se, and allowing a surface of moisture absorbent 1 to be consequently, optically scanned suffices.

In the present embodiment, optical scanning causes energy converting particle 2 buried in each site of the moisture absorbent to successively generate heat and thus allows moisture absorbent 1 in each site to be changed from the first state to the second state to thus allow absorbed moisture to be efficiently extracted.

Figure 13:
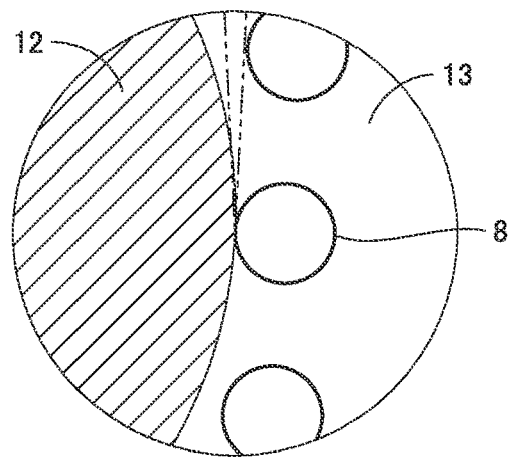
FIG. 13 is an enlarged view of a portion Z1 shown in FIG. 12.

FIG. 13 is an enlarged view of a portion Z1 shown in FIG. 12 while scanning. A region which laser light 14 has already scanned is a hydrophobic region 12, and a region which laser light 14 has not yet scanned is a hydrophilic region 13. As laser light 14 scans moisture absorbent 1 in the form of the disk from (a vicinity of) the center toward the circumference, the diameter of hydrophobic region 12 gradually increases. Hydrophilic region 13 will remain in the form of a ring outside hydrophobic region 12. The moisture contained in moisture absorbent 1 will be purged from (a vicinity of) the center toward the circumference. Finally, water will be discharged from the circumference in the liquid state. Furthermore, the water in the liquid state that is discharged to the upper and lower surfaces of moisture absorbent 1 in the course of the scan is guided toward the circumference by the centrifugal force caused as moisture absorbent 1 rotates, and such water can thus be discharged efficiently.

Note that a phenomenon can arise in which as a spot of laser light 14 moves, a site exposed thereto is heated and becomes hydrophobic, however, once the spot has gone away, the site is cooled and again capable of absorbing moisture, and would thus absorb the water that has once purged away. To prevent such a phenomenon, the step of moving the converged spot laser light 14 to scan moisture absorbent 1 from an inner side toward an outer side may be repeated a plurality of times rather than only once.

(Fourth Embodiment)

Figure 14:
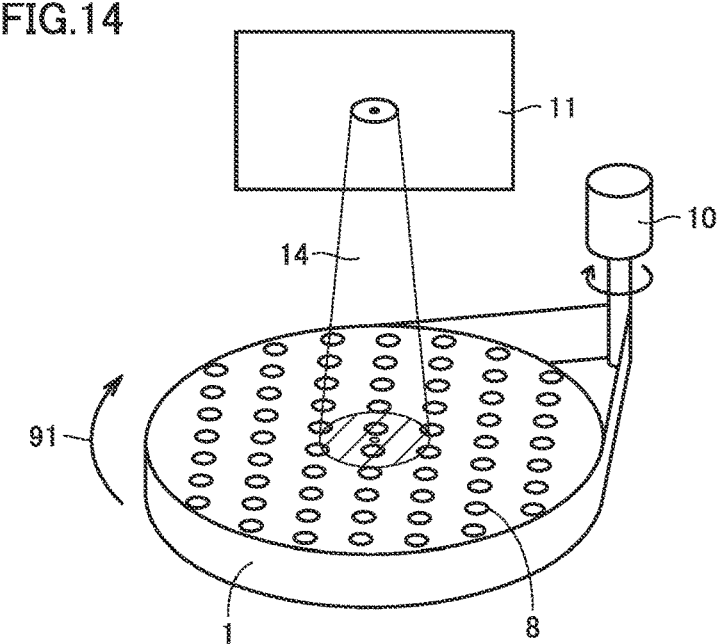
FIG. 14 illustrates a first operational state of a humidity controlling apparatus in a fourth embodiment based on the present invention.
Figure 18:
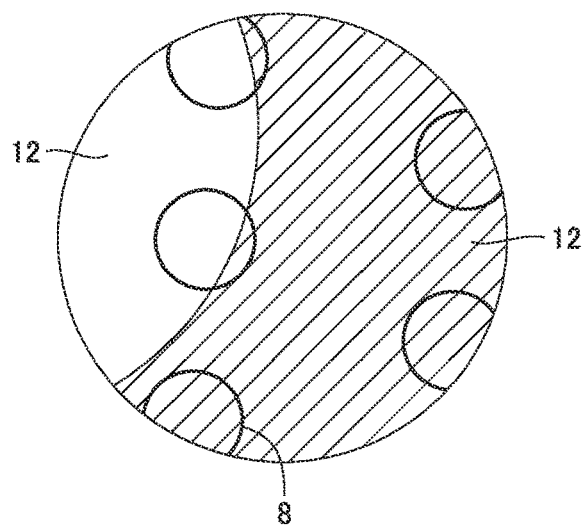
FIG. 18 is an enlarged view of a portion Z3 shown in FIG. 17.

With reference to FIG. 14 and FIG. 18, a humidity controlling apparatus in a fourth embodiment based on the present invention will now be described. Although the humidity controlling apparatus in the present embodiment is similar to that described in the third embodiment, they are different in how the optical scanning is done. As shown in FIG. 14, in the humidity controlling apparatus of the present embodiment, radiation device 11 converges light into the form of a ring and exposes a surface of moisture absorbent 1 thereto such that the ring of light and the contour of moisture absorbent 1 are concentric, while the ring is increased in diameter from an inner side of moisture absorbent 1 toward an outer side thereof to thus scan moisture absorbent 1. In the present embodiment, the light is laser light 14. The remainder of the basic configuration is similar to those described in the previous embodiments.

Figure 15:
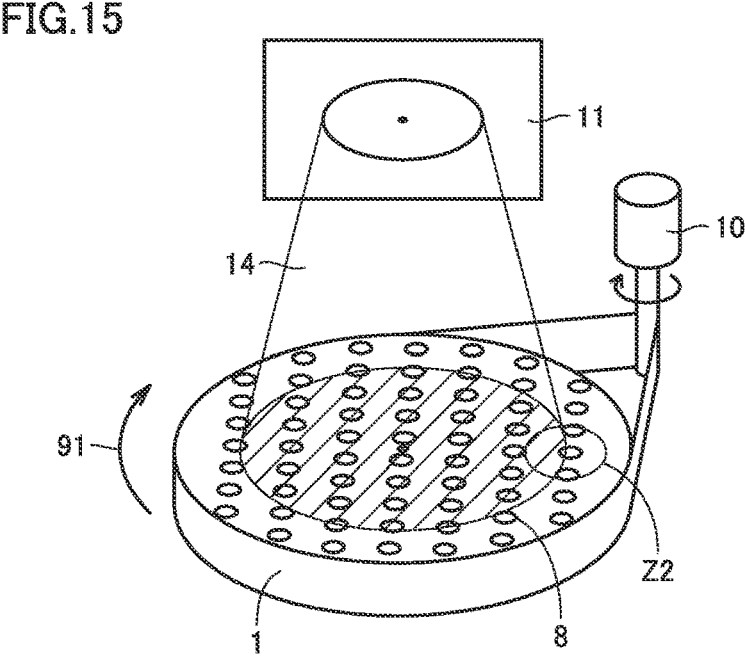
FIG. 15 illustrates a second operational state of the humidity controlling apparatus in the fourth embodiment based on the present invention.
Figure 16:
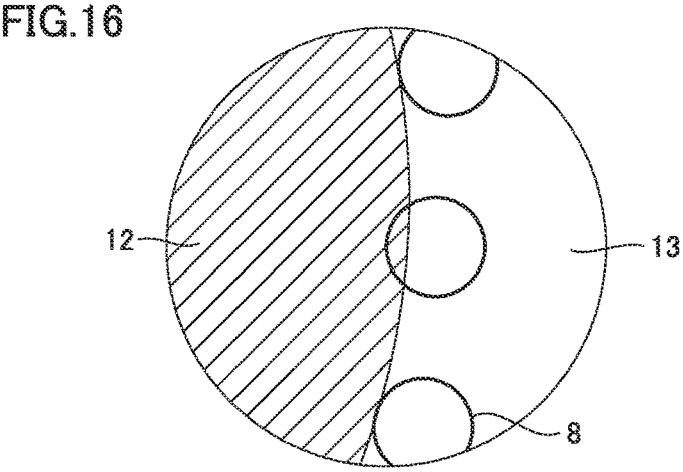
FIG. 16 is an enlarged view of a portion Z2 shown in FIG. 15.
Figure 17:
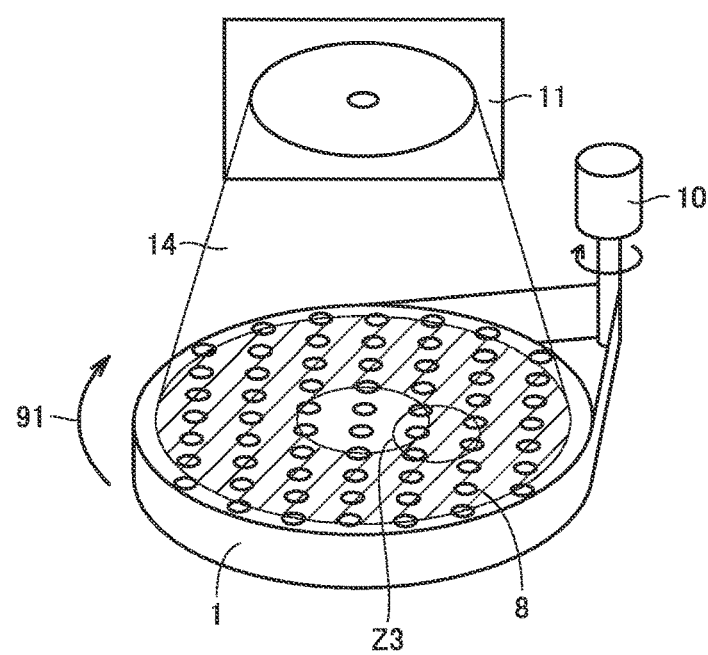
FIG. 17 illustrates a third operational state of the humidity controlling apparatus in the fourth embodiment based on the present invention.

The light started to expose moisture absorbent 1 thereto, as shown in FIG. 14, has an outer diameter gradually increased, as shown in FIG. 15. FIG. 16 is an enlarged view of a portion Z2 shown in FIG. 15. When moisture absorbent 1, which is originally hydrophilic, is exposed to light, energy converting particle 2 buried in each site of the moisture absorbent successively generates heat, and moisture absorbent 1 thus varies to have hydrophobicity. Accordingly, a region which is not yet exposed to light is hydrophilic region 13, as shown in FIG. 15, whereas a region exposed to light is hydrophobic region 12. As the ring's outer diameter increases as shown in FIG. 15, the ring's inner diameter also increases as shown in FIG. 17. Increasing the inner diameter is not necessarily started after increasing the outer diameter is completed. While the outer diameter is increased, the inner diameter may also be increased in parallel. FIG. 18 is an enlarged view of a portion Z3 shown in FIG. 17. A portion which the radiation of the light has passed also becomes hydrophobic region 12.

In the present embodiment, optical scanning by light converged in the form of a ring causes energy converting particle 2 buried in each site of the moisture absorbent to successively generate heat and thus allows moisture absorbent 1 in each site to be changed from the first state to the second state, and the moisture contained in moisture absorbent 1 will be purged in the form of a ring from (a vicinity of) the center toward the circumference. This ensures that the moisture contained in moisture absorbent 1 is purged toward the circumference and the absorbed moisture can be efficiently extracted (Reference Technique)

Figure 19:
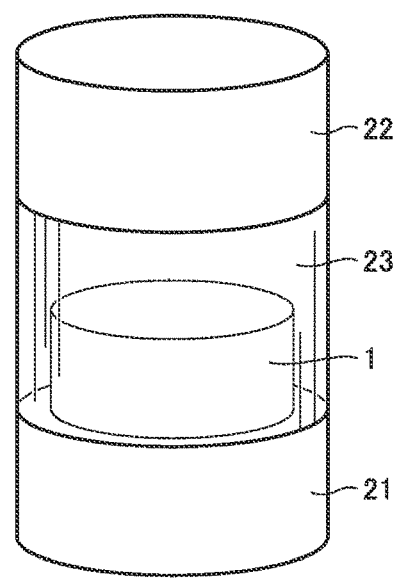
FIG. 19 is a perspective view of an air conditioner based on a reference technique.

A reference technique will now be described with reference to FIG. 19 and FIG. 20.

An evaporating humidifier apparatus includes a blower for introducing external air and passing it through the apparatus, and an evaporating filter. The evaporating filter serves to release stored moisture as water vapor. The evaporating filter is formed by processing an absorptive material such as absorptive fiber, nonwoven fabric, etc. in the form of a filter. The apparatus performs humidification by previously storing moisture in the evaporating filter and operating the blower to pass air through the filter.

To do this, however, it is important that the evaporating filter is sufficiently moist, and when the evaporating filter has an absorptive capacity decreased by a scale component adhering thereto, soiling or the like, the evaporating filter may be in an entirely or partially dry state. In such a state, the filter cannot exhibit sufficient humidifying performance To avoid such a situation, it is necessary to take care of or replace the evaporating filter periodically, however, it is not easy to confirm whether conventional evaporating filters are dry or moist, and it is often the case that the user is unaware that the evaporating filter has a reduced absorptive capacity.

Furthermore, there is also a case in which it is difficult for the user to locate where the evaporating filter is installed. There were also many users who are unaware of the existence of the evaporating filter.

To address such an issue, an air conditioner as indicated below by Supplementary Notes may be considered. An example of this air conditioner is shown in FIG. 19. This air conditioner is in the form of a cylinder including a water tank 21 at a lower portion thereof and a blower 22 at an upper portion thereof, and including a transparent cylindrical portion 23 at an intermediate portion thereof. Inside transparent cylindrical portion 23, moisture absorbent 1 is included as a evaporating filter.

(Supplementary Note 4)

An air conditioner for humidifying an environment by causing moisture to evaporate and thus releasing the moisture, comprising a evaporating filter absorbing moisture and capable of storing the moisture, and also capable of releasing the stored moisture into the air as water vapor, the evaporating filter when dry presenting a first color, when wet changing to a second color different from the first color, and when again dry exhibiting reversibility to return to the first color.

For example, silica (silicon dioxide) may be mixed with, applied to or printed on a material of a conventional evaporating filter. In that case, when dry, a white color is presented, and when wet with water, the silica becomes transparent and a color hid under the silica emerges.

(Supplementary Note 5)

The air conditioner described in Supplementary Note 4, having the evaporating filter disposed to be externally visible.

For example, the evaporating filter may be accommodated in a transparent case so that the user can externally observe the evaporating filter through the transparent case.

(Supplementary Note 6)

The air conditioner described in Supplementary Note 4 or 5, wherein a portion which changes in color reversibly between the first color and the second color is partially disposed to inform the user of a trouble via a change in color.

Figure 20:
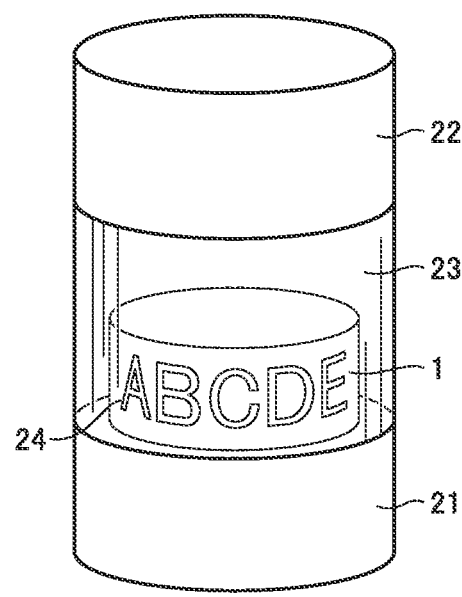
FIG. 20 is a perspective view of a state in which a character emerges on the air conditioner based on the reference technique.

For example, when it dries and changes in color, moisture absorbent 1 may have a surface displaying a character 24, as shown in FIG. 20. Character 24 is visually observable by the user through transparent cylindrical portion 23. Although FIG. 20 shows a string of characters "ABCDE" as an example, this character string is a tentative one for indicating that a character can be displayed by a change in color, and in reality it is possible for example to put a word meaning "dry" in an appropriate language. When silica is used, and it is dry, a white character emerges. Of a character and a background, not only is the character exclusively changed in color but, in contrast, the background may instead be changed in color. Not only a character but a mark, a picture, a pattern, etc. may also be displayed.

By utilizing the phenomenon of displaying a word by such a change in color, a scheme of visually informing the user when the evaporating filter has a defect or its lifetime expires and the filter should be replaced, may also be considered.

Note that when a humidifier apparatus including a humidifying element and a tank for reserving water is assumed, the following configuration may be considered: A configuration may be considered in which an identifiable element is prepared which is formed of the macromolecular gelated moisture absorbing material described in the previous embodiments and also having a nature presenting cloudiness when the material is dry and presenting high optical transmittance when the material absorbs moisture and this identifiable element is attached to the humidifying element at a position distant from the surface of the water in the tank, i.e., at an intermediate or upper portion as seen vertically. When the tank is empty of water, the humidifying element and the identifiable element are also dry, and accordingly, the identifiable element becomes cloudy. When water is introduced into the tank and a prescribed period of time elapses, the moisture sucked up by the humidifying element is absorbed into the identifiable element, and the optical transmittance of the identifiable element is increased. Note that when scale or the like adheres to the humidifying element and thus degrades the humidifying element, however, the humidifying element cannot suck up the water of the tank sufficiently. Accordingly, while the tank contains water, sufficient moisture does not reach the identifiable element and the identifiable element is still clouded as it is when dry, and thus has optical transmittance unrecovered. This may be handled by informing the user in advance that when the tank is replenished with water and a prescribed period of time subsequently elapses, and despite that the identifiable element is not transparent, then it is time to replace the humidifying element. Alternatively, a transmittance or reflectance measurement device may be used to monitor the identifiable element's optical characteristics and when a time to replace the humidifying element arrives the user may be informed accordingly.

Note that a plurality of the above embodiments may be combined together as appropriate and thus adopted.

It should be understood that the embodiments disclosed herein are illustrative and non-restrictive in any respect. The scope of the present invention is defined by the terms of the claims, rather than the description above, and is intended to include any modifications within the meaning and scope equivalent to the terms of the claims.

INDUSTRIAL APPLICABILITY

The present invention is applicable to humidity controlling apparatuses.

REFERENCE SIGNS LIST

1: moisture absorbent; 2: energy converting particle; 3: blown air; 4: light; 5: water; 6: casing; 7: substrate; 8: vent hole; 9: air blowing fan; 10: rotation device; 11: radiation device; 12: hydrophobic region; 13: hydrophilic region; 14: laser light; 15: central axis; 21: water tank; 22: blower; 23: transparent cylindrical portion; 24: character; 91, 92: arrow; 101,102: humidity controlling apparatus.

The invention claimed is:

1. A humidity controlling apparatus comprising:
   a moisture absorbent made of a macromolecular gelated moisture absorbing material which takes a first state being capable of absorbing moisture and a second state releasing in a liquid state the moisture absorbed in the first state, and which has a nature to change from the first state to the second state when a definite level of temperature or higher is attained, and return to the first state when the definite level of temperature or higher is no longer attained; and
   an energy converting particle which is disposed so as to be buried inside the moisture absorbent and has a nature to generate heat when it is exposed to an external stimulus factor which is at least one of light, electric waves, and a high frequency magnetic field, wherein
   the humidity controlling apparatus exposes a surface of the moisture absorbent to the external stimulus factor, and scans the moisture absorbent from an inner side toward an outer side.

2. The humidity controlling apparatus according to claim 1, wherein the moisture absorbent is particulate and the energy converting particle is buried in each particle of the moisture absorbent.

3. The humidity controlling apparatus according to claim 1, wherein
   the stimulus factor is light,
   the moisture absorbent is disposed in a form of a disk, and
   the humidity controlling apparatus includes a rotation device rotating the moisture absorbent about a central axis, and a radiation device which exposes a surface of the moisture absorbent to light.

4. The humidity controlling apparatus according to claim 3, wherein the radiation device converges light into a spot and exposes a surface of the moisture absorbent thereto, and scans the moisture absorbent with the spot of light from the inner side toward the outer side.

5. The humidity controlling apparatus according to claim 3, wherein the radiation device converges light in a form of a ring and exposes the surface of the moisture absorbent thereto such that the ring of light and a contour of the moisture absorbent are concentric, while the ring is increased in diameter from the inner side of the moisture absorbent toward the outer side of the moisture absorbent to scan the moisture absorbent.

* * * * *